(12) United States Patent
Jurca

(10) Patent No.: US 7,289,269 B2
(45) Date of Patent: Oct. 30, 2007

(54) PROCESS AND ARRANGEMENT FOR SUPERIMPOSING RAY BUNDLES

(75) Inventor: Marius Christian Jurca, Alzenau (DE)

(73) Assignee: My Optical System GmbH, Giebelstadt (DE)

(*) Notice: Subject to any disclaimer, the term of this patent is extended or adjusted under 35 U.S.C. 154(b) by 69 days.

(21) Appl. No.: 11/231,362

(22) Filed: Sep. 20, 2005

(65) Prior Publication Data

US 2006/0065815 A1 Mar. 30, 2006

(30) Foreign Application Priority Data

Sep. 20, 2004 (DE) .................... 10 2004 045 912

(51) Int. Cl.
*G02B 27/10* (2006.01)
(52) U.S. Cl. ...................... 359/618; 359/626
(58) Field of Classification Search ................ 359/618, 359/625, 626, 627, 629, 495, 496; 362/227, 362/234
See application file for complete search history.

(56) References Cited

U.S. PATENT DOCUMENTS

| | | | |
|---|---|---|---|
| 3,924,937 A | 12/1975 | Munroe et al. | |
| 4,826,269 A | 5/1989 | Streifer et al. | |
| 6,137,631 A | 10/2000 | Moulin | |
| 2002/0191662 A1* | 12/2002 | Perry et al. | 372/66 |
| 2003/0031226 A1* | 2/2003 | Byren et al. | 372/66 |
| 2004/0067016 A1* | 4/2004 | Anikitchev et al. | 385/34 |

FOREIGN PATENT DOCUMENTS

| | | |
|---|---|---|
| DE | 195 14 626 A | 10/1996 |
| DE | 195 37 265 CI | 2/1997 |
| DE | 197 25 262 A | 12/1998 |
| DE | 100 62 453 A1 | 7/2002 |
| DE | 101 21 678 A1 | 11/2002 |
| DE | 100 62 454 A | 3/2003 |
| DE | 199 49 198 A | 5/2004 |
| WO | WO99/64912 A1 | 12/1999 |
| WO | WO03/098758 A1 | 11/2003 |

* cited by examiner

*Primary Examiner*—Alcia M Harrington
(74) *Attorney, Agent, or Firm*—Factor & Lake, Ltd.

(57) ABSTRACT

A process and an arrangement are described by means of which a plurality of ray bundles emitted from individual radiation sources are combined with the aid of an imaging optics system. The individual radiation sources are in this connection arranged on at least one curve surrounding the optical axis of the imaging optics system. The individual ray bundles are substantially linearly polarised. The bundles are reflected on their path to the superimposition point at least at a surface whose reflection capability is polarisation-dependent. The polarisation direction of the ray bundles coming from the individual radiation sources is in this connection aligned so that the first reflection at the surface takes place with low loss, whereas a possible second reflection after previous reflection at the workpiece takes place with high loss. In this way the individual radiation sources are protected against damaging back-reflections.

4 Claims, 4 Drawing Sheets

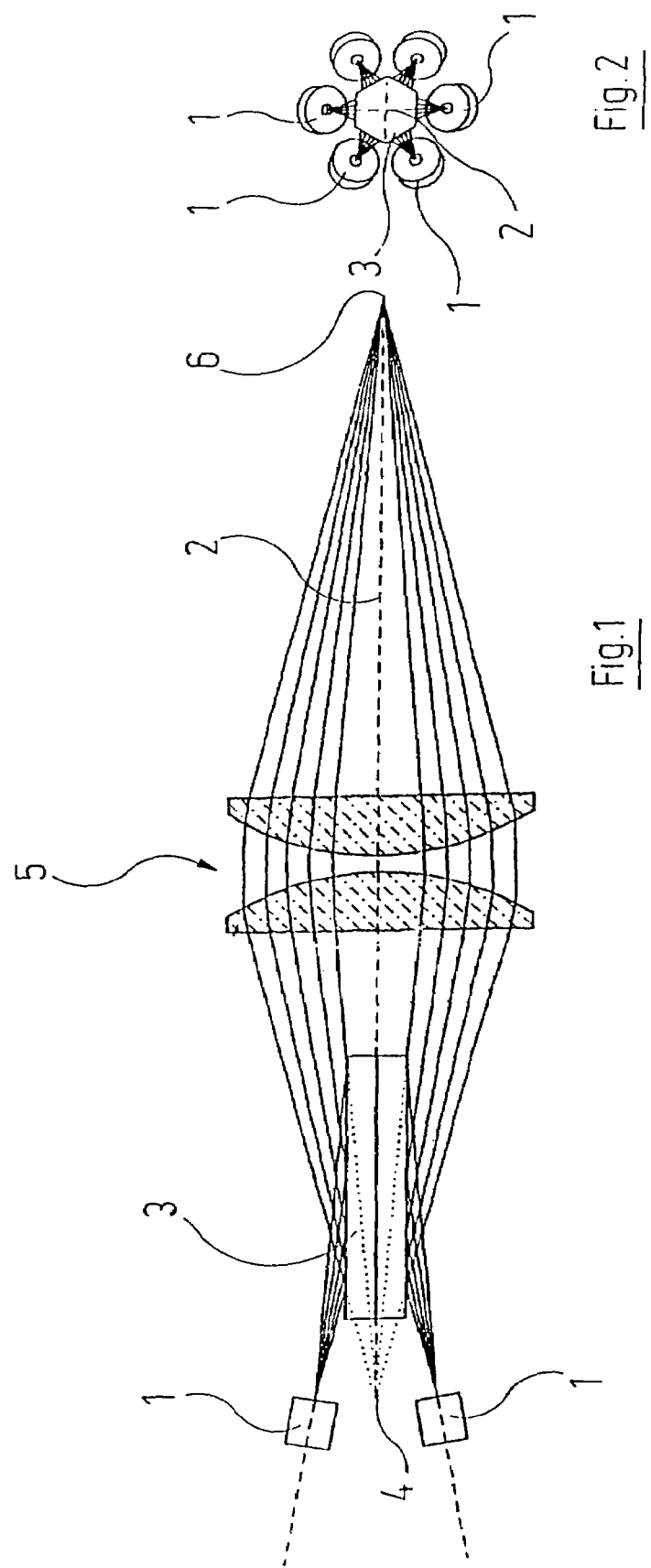

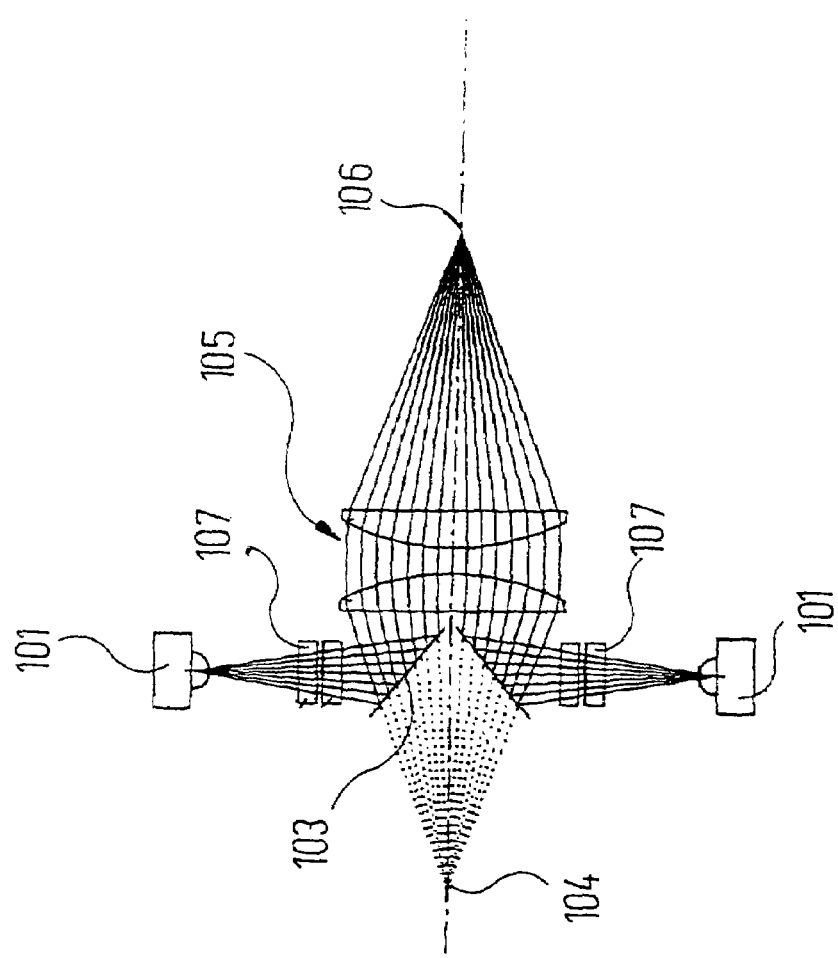
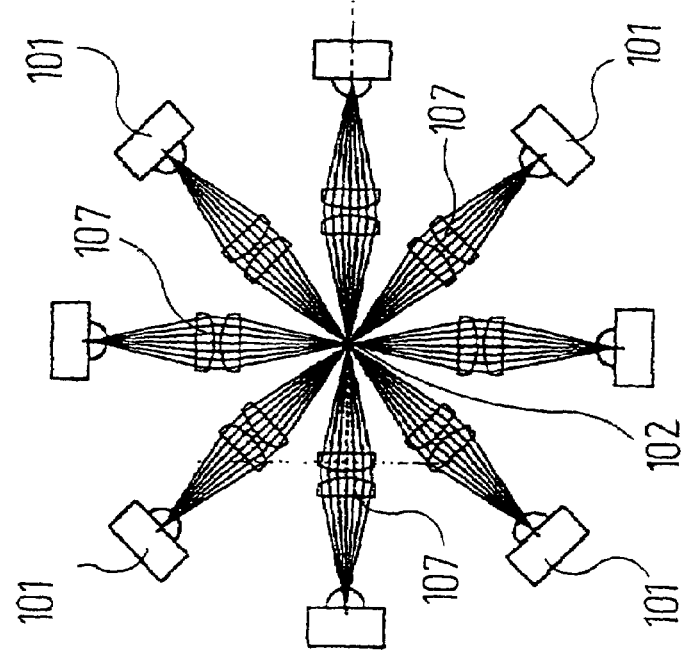

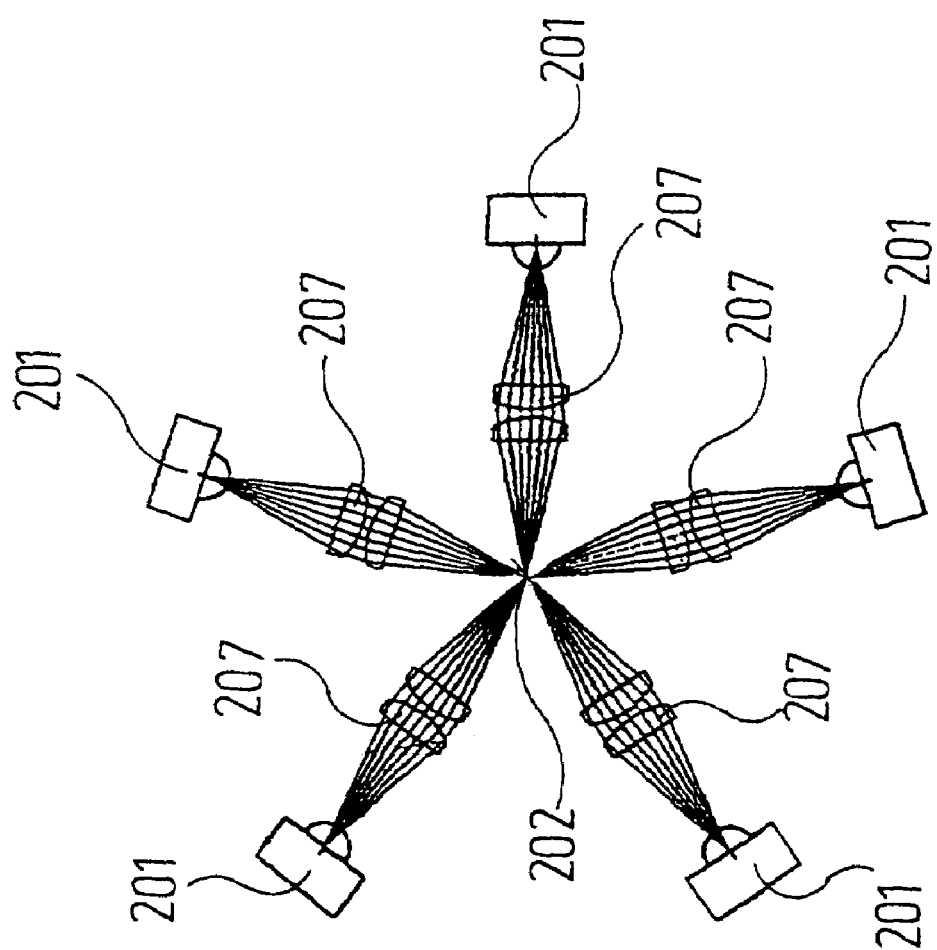

PROCESS AND ARRANGEMENT FOR SUPERIMPOSING RAY BUNDLES

RELATED APPLICATION

This patent application claims the benefit of the filing date of German patent application no. DE 10 2004 045 912.6, filed Sep. 20, 2004.

BACKGROUND OF THE INVENTION

The present invention relates to a process for superimposing ray bundles that are emitted by a plurality of individual radiation sources and are combined with the aid of a ray forming and focussing optics system, in which the individual radiation sources are arranged on at least one curve surrounding the optical axis of the ray forming and focusing optics system, as well as an arrangement for superimposing ray bundles that are emitted by a plurality of individual radiation sources, with a ray forming and focusing optics system that combines the ray bundles at a superimposition point, in which the individual radiation sources are arranged on at least one curve surrounding the optical axis of the ray forming and focusing optics system.

Such processes and arrangements are used in cases where the radiation from a plurality of individual radiation sources, e.g. for increasing output, are to be concentrated in a relatively small spatial operating region. Such applications occur in material processing and working, for example in laser welding, cutting or drilling, as well as in surface treatment. Other applications include medical treatment in ophthalmology, in dental technology and in dermatology. A further area of use is in the telecommunications sector, in cases where in a data transmission channel realised by means of an optical fibre, a high light output is required for the information transfer over wide stretches without intermediately-connected amplifiers. A small numerical aperture of the coupled optics system is necessary in such cases.

With such known processes and arrangements laser diode arrays are normally used as light sources, which are termed "bars" or "stacks". A "bar" comprises a plurality of individual laser diodes arranged in a linear array. A high output laser diode array of this type has a typical light emitted output of about 50W. Typical total emission surfaces of such laser diode a typical light emitted output of about 50W. Typical total emission surfaces of such laser diode arrays have a long side (long axis, so-called "slow axis") of about 10 mm and a narrow side (short axis, so-called "fast axis") of ca. 1 micrometre. The individual laser diode structures are in this connection distributed linearly on the long side of the bar (about 10 to 50 pieces) and normally have a width of 40 micrometres to 500 micrometres along the long side of the bar. The beam divergence of the light emitted from the laser diode arrays in the planes parallel to the short axis of the emission surface is typically greater by a factor of 3 to 4 than in the directions perpendicular thereto and thus corresponds to the radiation characteristics of the individual laser diode structures, which are termed "emitters" or "individual emitters". The radiation from the individual emitters is not coherent with the radiation of the adjacent structures. No light is emitted between the emitters.

Such "bars" can be stacked on one another, resulting in the formation of "stacks". The emission bundles of the individual emission surfaces of the laser diode arrays are superimposed within the "stack" in order to utilise the light output (optical power) of the whole "stack". For the this purpose it is known to assign to each individual emitter within the laser diode array stacked in the "stack" a microlens that guides the emission bundle of an individual emitter to the coupling end of an optical fibre associated therewith. In this way a plurality of fibres is associated with a "bar" or also with a "stack", which can be guided in a fibre bundle. The decoupling end of the fibre bundle can then be imaged in order to generate an operating laser beam bundle. This arrangement has three disadvantages: on the one hand light is lost because the optics system cannot be fully illuminated. On the other hand, in order to obtain a small focal point the focal width of the microlenses must be kept small, which leads to a large numerical aperture associated with coupling losses. Finally, the number of individual light sources that can be added in this way to form a common focal point is limited.

The handling of such a microlens array is relatively complicated since the microlenses have to be arranged close to the individual emitters and the adjustment is correspondingly critical. In addition, when using microlenses in conjunction with high output laser diode arrays the production and choice of material is very problematic since even very small absorptions at the emission wavelength of the laser diodes lead to an unacceptable heating of the microlenses.

Ray guidance systems that concentrate the light from a plurality of spatially separated point-like light sources in a focal point are known. Expressed in wave-optics terms, a distinction is made between processes in which the wave fronts of the individual light sources are used for the overlapping, and those processes in which the wave fronts of the individual light source are aligned next to one another in order to form in the combination a larger overall wave front. In this connection it is assumed that the ray bundle of each individual light source and thus also the wave front, defined as the eikonal area of the ray bundle, has a similar cross-section.

When using the process and the arrangement mentioned in the introduction for laser marking, one of the most important preconditions is that a specific material-dependent threshold of the power density at the workpiece is exceeded by the incident laser radiation. Most surfaces that are to be marked, in particular metals, reflect laser radiation to a large extent. Only after the power density threshold has been exceeded does a capillary (so-called "keyhole") form in the surface, through which most of the applied laser radiation is instantaneously absorbed. The laser radiation reflected back from the object surface represents a serious problem since this passes back through the focussing optics system, with the result that the optical components that are used for the focussing are subjected to double or in some cases to even greater optical stresses. In this connection not only coatings and glazings but also fibres and crystals in the corresponding configurations may be destroyed. The laser diodes, in particular high output laser diodes, that are used as individual light sources are threatened to an even greater extent. It is known that laser diode systems react very sensitively in the case of back-reflections and can be destroyed by the latter.

Outputs that are not particularly high, normally between 10 and 100 Watts, are required for marking applications. The size and shape of the focal point on the workpiece surface are accordingly very important. Due to the high degree of anisotropy of the radiation that high output laser diodes normally have, as mentioned above, and the lack of coherence of the radiation in the slow axis, it is not possible with normal optical focussing elements to generate, for operating distances customary in practice, a focus that is so small that the aforementioned power density threshold for marking on metallic surfaces is exceeded. By and large high output laser diode arrays are therefore prima facie conceptually unsuitable for such a task on account of their ray quality. Due to the fact that the marking takes place on the surface of the workpieces, in other words unlike in welding or deep welding, a large depth sharpness for the laser focussing is not necessary. With a correspondingly small focal length and large aperture of the focussing optics a sufficiently small focus can thus be generated. However, such a small focus generally utilises nothing in practice since, in particular for marking purposes, a narrow ray bundle, i.e. a small divergence of the rays in the focus, is required in order to be able to deflect the ray bundle via a scanner, generally an XY scanner, which normally has a small free beam aperture.

Most known arrangements for laser marking use lamp-pumped solid state lasers. These have a comparatively poor efficiency. In flash lamp-pumped solid state lasers the pumping energy is derived from the emission spectrum of the flash lamps. The overall efficiency of such arrangements is ca. 3%. The use of laser diodes for pumping solid state lasers considerably increases the efficiency of the solid state lasers pumped in this way (ca. 50% for the high output laser diodes, ca. 50% for the optical coupling of the energy and, finally, a further ca. 50% efficiency of the solid state laser itself, which corresponds to an overall efficiency of at best 12.5%). It is therefore easily understandable why the direct use of laser diodes with an efficiency of about 50% is economically so attractive.

Known focussing arrangements that employ exclusively laser diodes are often not very effective, even though the efficiency of the laser diodes is very high. For example, arrangements are known in which a ray bundle is deflected at a partly light-transparent deflection mirror so that it runs in parallel to and in an overlapping manner with a second ray bundle. A loss-free coupling is possible if the deflection mirror has a wavelength-dependent reflectivity and the two ray bundles have different wavelengths. In a similar way a polarising beam splitter cube can combine two ray bundles with orthogonal polarisation. The disadvantage is that only two ray bundles can be combined.

It is also known to combine a plurality of ray bundles of different wavelengths by means of a diffraction grating. The disadvantage is that the coupling efficiency of the diffraction grating is far less than 100% and monochromatic light sources with an accurately-graded sequence of wavelengths are required.

In known arrangements of the type mentioned in the introduction an optical element (lens, mirror, prism) is in each case associated with a linearly-arranged group of light sources of the laser diode structure or with an individual light source, the object of which optical element is to deflect or form the light of this group of light sources so that the focal points of the ray bundles that derive from all individual light sources of the laser diode structure come together at one point.

An example of such an arrangement is described in WO 99/64912 A1. In this case a two-dimensional matrix of microlenses is used, each of which collimates the ray bundle of an individual light source. After the microlens matrix the rays of all individual light sources run in parallel, so that a focussing lens can collect the ray bundles in a single focal point. In a variant of this known principle the microlens matrix is replaced by two line-type systems of cylindrical lenses arranged one after the other. The cylindrical axis of the first system are perpendicular to the cylindrical axes of the second system. A line or gap of light sources is associated with each cylindrical lens. The cylindrical lenses of the first system align all rays parallel to a plane, and the cylindrical lenses of the second system align the rays parallel to one another.

The arrangement described in DE 195 37 265 C1 uses a matrix of microprisms that deflect the ray bundles of a matrix of individual light sources of a laser diode structure so that all ray bundles apparently have the same starting point. An optical system arranged there behind forms an image of the common virtual object point on the focal point in the focal plane.

In a further group of known arrangements, such as are described for example in DE 195 14 626 A and DE 197 25 262 A, pairs of stepped mirrors or stepped prisms are used that displace the individual ray bundles of a system of ray bundles running in parallel but widely spaced apart from one another, in such a way that the distance between adjacent ray bundles is reduced or brought to zero.

The disadvantage with all these known arrangements is that, as already indicated above, a diode bar contains 12 to 48 individual emitters arranged in lines and an optical deflection element of the described type has to be produced for each individual emitter. In arrangements that cannot be adjusted, during manufacture position tolerances of the deflection elements have to be maintained in the micrometre range so that the ray bundles can be sufficiently accurately aligned in parallel. With arrangements that can be adjusted, each of these 12 to 48 deflection elements must be positioned to micrometre accuracy. Furthermore, the permanent stability of the adjusted positions must be guaranteed.

Further processes for combining the wave fronts of individual light sources are described in DE 100 62 453 A, DE 100 62 454 A and DE 199 49 198 A. Here, annular arrangements of diode bars that ensure a homogeneous illumination of the focal point are employed. The beam quality is adversely affected by the use of diode arrays; due to the admittedly technologically advantageous free optical axis of the focussing head the beam quality is impaired by reduction of the "filling factor". Due to the fact that the ray-forming components are arranged around the central free optical axis, a greater divergence of the ray bundle in the focus is produced than when using the central space.

In U.S. Pat. No. 6,137,631 A the light from a laser diode bar is collimated with the aid of a cylindrical lens and a following spherical optics system. The opening through which the light enters a reflector element, consisting of a pair of parallel mirrors, is located at the point of intersection of the ray bundles of the individual emitters. The ray bundles are reflected variously often depending on the angle of incidence. A focussing lens that generates an intermediate image of the bar is located at the outlet opening of the reflector element. The arrangement is similar to that described in DE 101 21 678 A. Although this arrangement can handle all images of the individual emitters of a bar very efficiently, the focal point is however only the enlarged image of one individual emitter and the arrangement is restricted for practical reasons to one diode bar. The beam quality is however improved by increasing the so-called "degree of filling", since the individual ray bundles from different directions arrive at the focal point.

Finally, from U.S. Pat. No. 4,826,269 A, a circular laser diode arrangement is also known, in which an anamorphotic image, which is disadvantageous in many respects, is used to focus the laser diodes.

BRIEF SUMMARY OF THE INVENTION

The object of the present invention is to configure a process and an arrangement of the type mentioned in the introduction so that the danger of damaging individual light sources due to radiation reflected at the workpiece is reduced.

This object, as regards the process, is solved by the fact that the individual ray bundles are polarised substantially linearly and are reflected in their path to the superimposition point at least at a surface whose reflection capability is polarisation-dependent, wherein the polarisation direction of the radiation coming from the individual radiation sources is aligned so that the first reflection at the surface takes place with low loss, whereas a second reflection, after preceding reflection at the workpiece, takes place with high loss.

The invention utilises the fact that in a reflection at the workpiece an initially existing linear polarisation of the radiation is generally converted into an elliptical polarisation. If this elliptically polarised back radiation now arrives a second time at one of the reflecting surfaces, then the polarisation conditions for the reflection are no longer optimal; however, a very small proportion of the radiation is reflected in the direction of an individual radiation source, which is thereby no longer threatened.

The aforementioned object is, as regards the arrangement, solved by the fact that a) a reflecting surface whose reflection capability is polarisation-dependent is arranged in the ray path of each ray bundle; b) the ray bundles are in each case polarised substantially linearly, wherein c) the direction of polarisation is aligned so that the first reflection of the ray bundles coming from the individual radiation sources takes place with low loss, whereas a second reflection after a preceding reflection at the workpiece takes place with high loss.

The advantages of the arrangement according to the invention correspond to the advantages outlined above of the process according to the invention.

A convenient configuration of the arrangement according to the invention envisages that the reflecting surfaces are formed on a polygonal mirror, which has as many sides as there are individual radiation sources. The polygonal mirror constitutes a faceted element whose individual facets however do not need to be adjusted in situ. Instead, the polygonal mirror can be prefabricated as a unit at the factory. The polygonal mirror can take over a function in the superimposition of the ray bundles.

Alternatively it is also possible for all reflecting surfaces to be formed on a conical mirror. A faceting can be dispensed with here. In this case it is however convenient if, with the aid of a cylindrical lens arrangement, one of the axes of the individual radiation sources is formed on the optical axis.

The angle of incidence of the ray bundles coming from the individual radiation sources on the reflecting surface should be chosen so that a total reflection takes place. In this way radiation losses are minimised.

Other advantages and aspects of the present invention will become apparent upon reading the following description of the drawings and detailed description of the invention.

BRIEF DESCRIPTION OF THE DRAWINGS

Examples of implementation of the invention are described in more detail hereinafter with the aid of the drawings, in which:

FIG. 1 is a meridional section through a first example of implementation of an arrangement for superimposing ray bundles;

FIG. 2 is a sectional view along line II-II of FIG. 1;

FIG. 3 shows diagrammatically the beam path projected onto a sagittal plane in a second example of implementation of an arrangement for superimposing ray bundles;

FIG. 4 shows in the meridional section of the arrangement of FIG. 3;

FIG. 5 is a view similar to FIG. 3, in which, however, a non-mirror-symmetrical arrangement of the individual light sources is chosen; and, FIG. 6 is an isometric view of a heat protection device that can be used in all examples of implementation of the invention.

DETAILED DESCRIPTION OF THE INVENTION

Figure 6:
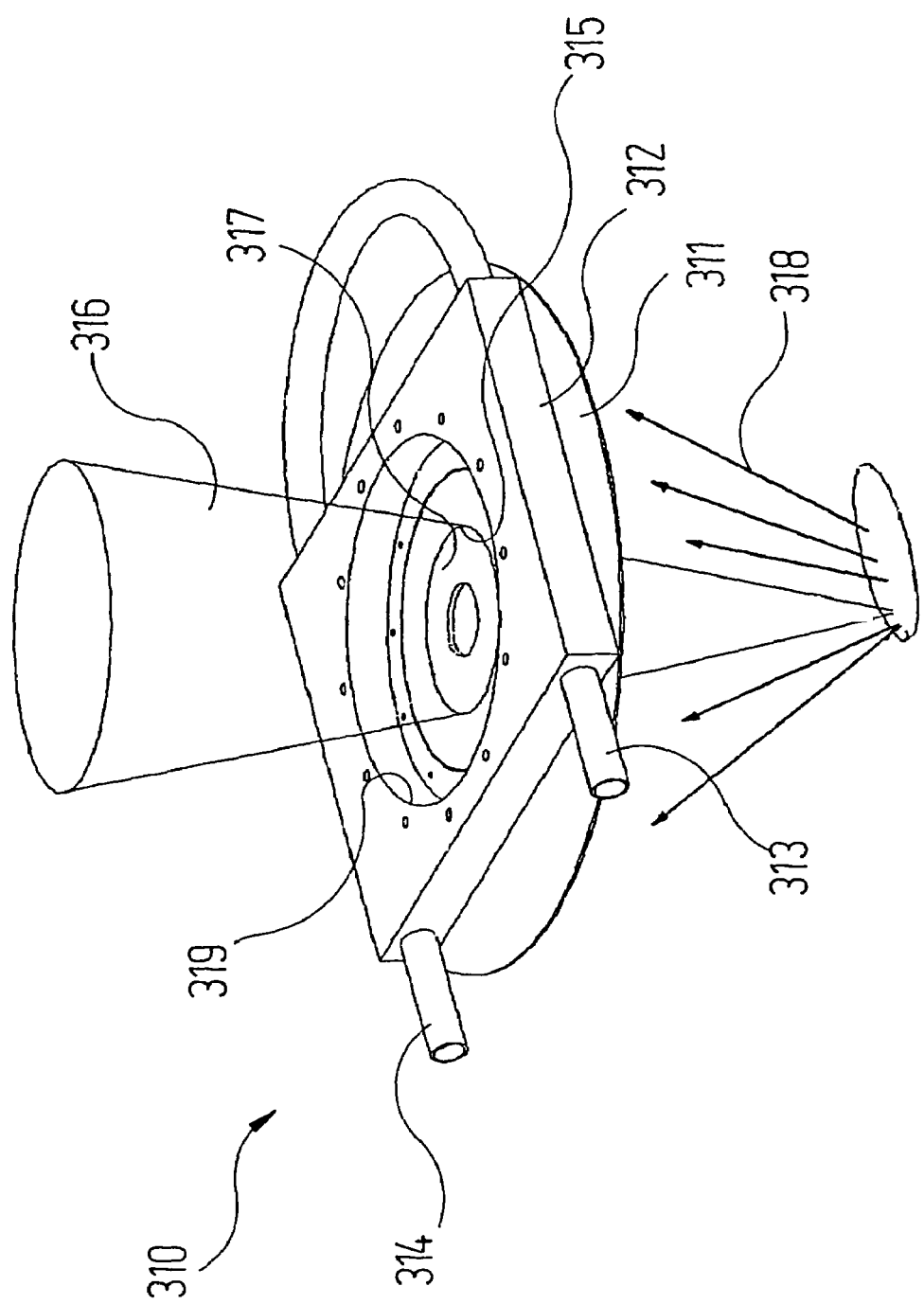

While the present invention is capable of embodiment in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

Reference will first of all be made to FIGS. 1 and 2. The arrangement illustrated here may be used in particular for marking purposes on workpieces. The arrangement includes six individual emitters, in the present case individual laser diodes 1, which are arranged at the same angular spacing of in each case 60° with respect to one another on a circle around the optical axis 2 of the arrangement. Each individual emitter 1 emits substantially linearly polarised light that is as far as possible spatially coherent. The better the coherence, the better the beam quality at the focal point.

The number of individual emitters 1 that are used is in principle the same, provided that their distance from one another is sufficiently large that each ray bundle starting from an individual emitter 1 can be imaged separately from the other ray bundles.

The individual emitters 1 radiate light onto a polygonal mirror 3 of hexagonal cross-section, whose axis coincides with the optical axis 2. The polygonal mirror 3 consists preferably of metal. The individual rectangular mirror surfaces of the polygonal mirror 3 are in this connection associated with the individual light sources 1 so that the result is the arrangement illustrated in FIG. 2. The individual mirror surfaces are inter alia irradiated at such a shallow angle that a total reflection occurs. The angle of incidence, measured with respect to the perpendicular to the reflecting surface, is for this purpose greater than 45°.

With the illustrated geometrical arrangement of polygonal mirror 3 and individual light sources 1, the individual light bundles are reflected from the polygonal mirror 3 as if they came from a common starting point 4. A beam forming and focussing optics system 5, which in the illustrated example of implementation is realised by two plane convex lenses, forms an image at a focal point 6 of the diverging rays starting from the polygonal mirror 3 in the focal plane in which the workpiece is located.

The individual emitters 1 are arranged on the aforementioned circle so that their "fast axis" runs in the azimuthal direction, i.e. tangentially to the circle. The individual emitters 1 thus transmit their originally linearly polarised light onto the reflection surfaces of the polygonal mirror 3 so that this light is reflected practically loss-free. If the light collected at the focal point 6 is reflected at the workpiece, then typically an elliptical polarisation of the radiation occurs. If this is now deflected rearwards through the focussing optics system 5 onto the polygonal mirror 3, the "back-reflection" is partly or wholly cancelled out on account of the unfavourable polarisation at the polygonal mirror 3. The danger of damage to the individual emitters 1 due to back-reflected light is thus greatly reduced.

FIGS. 3 and 4 show an arrangement for the marking of workpieces, which closely resembles the arrangement illustrated above with the aid of FIGS. 1 and 2. Corresponding parts are accordingly identified by the same reference numerals plus 100.

The arrangement of FIGS. 3 and 4 also comprises a plurality, in the illustrated example of implementation eight, individual emitters 101 which are arranged on a circle around the optical axis 102 of the arrangement. In contrast to the example of implementation of FIGS. 1 and 2, the individual emitters 101 however emit their light substantially in a radial direction.

The individual emitters 101 are aligned so that their slow axes. run azimuthally, i.e. tangentially to the circle on which the individual emitters 101 are arranged.

Each divergent light bundle leaving an individual emitter 101 first of all strikes a cylindrical optics system 107, which in the present case comprises two plane convex cylindrical lenses. As can be seen in particular from FIG. 3, the cylindrical optics 107 do not influence the propagation of the light in the direction of the "fast axis", whereas due to the cylindrical optics 107 a focussing onto the optical axis 102 takes place in the direction of the "slow axis".

After passing through the cylindrical optics 107 the ray bundles leaving the individual emitters 101 strike a conical mirror 103, which may be faceted similarly to the example of implementation of FIGS. 1 and 2, although it may also be configured as a true circular cone. The reflection of the individual ray bundles at the conical mirror 103 takes place once more so that, after the reflection, all rays appear to start from a single virtual object point 104. The imaging of the virtual object point 104 at the focal point 106 lying on the workpiece surface takes place once more with the aid of a beam forming and focussing optics system 105.

The mode of operation of the example of implementation illustrated in FIGS. 3 and 4 corresponds in principle to that of the first example of implementation, the conical mirror 103 now taking over the protective function against back-reflected light, which is based on the different polarisation states of the light emitted by the individual emitters 101 and of the light back-reflected by the workpiece.

In the examples of implementation of FIGS. 1 to 4 the arrangement of the individual emitters 1 and 101 was mirror symmetrical as regards different planes containing the optical axes 2 and 102. This has the disadvantage that, under unfavourable circumstances, in particular if the protective effect of the polygonal mirror 3 and of the conical mirror 103 is not sufficient, then light that starts from an individual emitter 1 or 101 can, after reflection at the workpiece, strike an individual emitter 1 or 101 lying mirror-symmetrically. In order to avoid this situation, the arrangement of the individual emitters may also be chosen so that no mirror plane containing the optical axis 2 or 102 is present.

This is illustrated in FIG. 5 for an example of implementation with five individual emitters 101, which basically corresponds to FIG. 3. Instead of eight individual emitters 101, in this case only five individual emitters 201 are provided, which are arranged in each case at the same angular distance from one another, namely at an angular distance of 72.degree. The drawing makes clear that a further individual emitter 201 is not diametrically oppositely associated with any of these individual emitters 201, so that light that starts from one of these individual emitters 201 cannot, after reflection at the workpiece, strike an oppositely-lying individual emitter 201 and damage the latter.

Due to the superimposition of the various ray bundles starting from the individual emitters 1 and 101, a very high energy density is produced at the focal point 6 and 106. The workpiece thus becomes hot. The corresponding (secondary) heat radiation acts in turn on the operating head containing the beam forming and focusing optics system and on the individual emitters. In order to protect these against the heat radiation a protective device may be provided, as is illustrated diagrammatically in FIG. 6 and identified overall by the reference numeral 310. This heat protective device 310 is in each case arranged between the outlet window of the beam forming and focussing optics system 5; 105 and the focal point 6; 106. The device comprises a circular copper sheet 311 serving as a screen, which is secured to a hollow aluminium block 312. The aluminium block 312 comprises two connection pipes 313 and 314 so that cooling water can flow through the block. The block is in turn fastened to the operating head, which is not shown in FIG. 6.

The copper block 311 comprises a through hole 315 concentric to the axis of the system, through which passes the converging laser beam 316 coming from the beam forming and focussing optics system. A heat protective glass 317, which is transparent to the laser light 316 but is impermeable to the heat radiation 318 emitted by the workpiece, is situated in the passage opening 315. Since the heat protective glass 317 is itself a poor thermal conductor, in cases of relatively high thermal stress it must be cooled by blowing on one or both sides.

The aluminium block 312 too has a passage opening 319, whose radius corresponding to the convergence of the laser light beam 316 is somewhat larger than the diameter of the opening 315 of the copper sheet 311.

In the above description it was assumed that, as regards the individual emitters, these are individual laser diodes. It is however also possible to use as individual emitters coherently coupled individual laser diodes or laser diode arrays so that the power density at the focal point can be correspondingly increased.

In a further example of implementation of the arrangement, not illustrated in the drawings, an enlarged intermediate image is generated in the imaging optics. This embodiment is suitable in particular for producing corresponding figures at the focal point by switching on or off individual emitters or groups of individual emitters. Thus, lettering or other symbols for engraving the workpiece surface can be produced by generating punctiform matrix-shaped intermediate images, which are generated by switching corresponding individual emitters on or off. Matrix-shaped foci may also be generated in the shape of the pin-out of integrated circuits, in particular of surface-mounted device components, in order to be able to solder these simultaneously onto a prepared printed circuit board. Particularly short operating times in the microsecond range can be achieved in this way.

In order to visualise the position of the focal point two laser diodes radiating in the visible wavelength range may be used, which lie on the same circle as the individual emitters and whose ray bundles intersect in the region of the focal point.

Instead of a polygonal mirror with outwardly arranged reflecting surfaces, a polygonal mirror with inwardly arranged mirror surfaces may also be used.

While specific embodiments of the present invention have been illustrated and described, numerous modifications come to mind without significantly departing from the spirit of the invention, and the scope of protection is only limited by the scope of the accompanying claims.

What is claimed is:

1. An arrangement for superimposing ray bundles, comprising:
    a) a plurality of individual radiation sources, wherein each radiation source is configured to emit a ray bundle being substantially linearly polarized and having a direction of polarization associated therewith, and wherein the individual radiation sources are arranged on at least one curve surrounding a source axis;
    b) a ray forming and focusing optics that combines the ray bundles at a superimposition point which is positionable on a work piece, wherein the ray forming and focusing optics has an optical axis that coincides with the source axis;
    c) a reflecting surface that has a polarization-dependent reflection capability and is arranged in the ray path of each ray bundle;
        wherein, for each ray bundle, the direction of polarization is aligned so that a first reflection of the ray bundle at the reflecting surface, before the ray bundle has been reflected at the work piece, takes place with a first optical loss, and a second reflection of the ray bundle at the reflecting surface, after the ray bundle has been elliptically polarized when being reflected at the work piece, takes place with a second optical loss which is greater than the first optical loss.

2. The arrangement of claim 1, wherein the reflecting surface is part of a polygonal mirror that has as many sides as there are individual radiation sources.

3. The arrangement of claim 1, wherein the reflecting surface is part of a conical mirror.

4. A process for superimposing ray bundles on a superimposition point located on a work piece, comprising the following steps:
    a) providing a plurality of individual radiation sources, wherein the individual radiation sources are arranged on at least one curve surrounding a source axis;
    b) emitting a plurality of ray bundles from the plurality of radiation sources, wherein the ray bundles are substantially linearly polarized and have a direction of polarization associated therewith;
    c) reflecting the ray bundles on a reflecting surface which has a polarization-dependent reflection capability, wherein the reflection occurs with a first optical loss;
    d) forming and focusing the ray bundles in the superimposition point positioned on the work piece using a forming and focusing optics having an optical axis that coincides with the source axis, wherein a portion of the ray bundles are reflected from the work piece and are thereby elliptically polarized;
        wherein, for each ray bundle, the direction of polarization is aligned so that a second reflection of the portion of the ray bundles, which have been reflected from the work piece in step d), takes place with a second optical loss which is greater than the first optical loss.

* * * * *